3,297,641
PROCESS FOR CROSS-LINKING POLYETHYLENE
Frank X. Werber, Rockville, and Razmic S. Gregorian, Silver Spring, Md., and William R. Johnson, Jr., Richmond, Va., assignors to W. R. Grace & Co., New York, N.Y., a corporation of Connecticut
No Drawing. Filed Jan. 17, 1964, Ser. No. 338,311
6 Claims. (Cl. 260—66)

This invention relates to an improvement in a novel polymerization process for preparing crosslinked polyolefins.

In summary, the invention is directed to the process of crosslinking normally solid polyethylene by blending same in an inert oxygen-free atmosphere at a temperature above its softening point with an aluminum compound of the formula: $AlR_3$ wherein R is a member of the group consisting of hydrogen, an alkyl, aralkyl, and cycloalkyl radical, with not more than two of the R's being hydrogen; the crosslinking occurring when an additive of the group consisting of sulfur, dibutyl maleate, 2,4-pentane dione, and azobenzene is added to the blend, which additives act as crosslinking agents, without any need for an oxygen atmosphere, thus permitting more subtle variations in degree of crosslinking effected than possible using free molecular oxygen.

Polymers of ethylene are well known in the art today and are generally characterized by their organic solvent solubility and their thermoplastic properties. Lately, several methods have been tried with varying success to decrease the thermoplasticity and solubility of polyethylene by crosslinking same. Chemical crosslinking is presently preferred to irradiation for many purposes due to the economics of the process. With regard to polyethylene, the main classes of chemical crosslinking agents have been organic peroxides and azo compounds (with the former being preferred due to greater uniformity of the product obtained). In any event, to date, all known chemical crosslinking processes are temperature dependent in regard to the crosslinking agent employed. Such dependency is a serious drawback and restricts the use of the various crosslinking agents to a marked degree. For example, benzoyl peroxide at the necessary blending temperatures is hazardous because the mixture may decompose violently. Other peroxides lack a sufficiently long half-life at the temperature of incorporation into the molten polymer to permit uniform crosslinking. This latter problem is especially prevalent where the polymer is high density polyethylene, i.e., 0.94–0.97, which has a melting point of at least 127° C. This melting point necessitates the use of very high processing temperatures, e.g., 150–200° C., thereby decomposing most known crosslinking agents at an excessive rate, and crosslinking the polymer to a high degree so rapidly that extruding operations are impossible on a commercial scale. Still other peroxide crosslinking agents, in the operable blending range, have half-lives in excess of periods which would be commercially acceptable. Thus there is a strong need for a crosslinking agent which is not dependent upon temperature for decomposition into free radicals with their accompanying crosslinking effect.

One object of this invention is to provide compounds capable of crosslinking polyethylene which are not temperature dependent. It is another object of this invention to provide compounds capable of crosslinking polyethylene under the conditions disclosed herein which do not require an oxygen atmosphere to effect crosslinking.

In the aforestated formula for the aluminum compound $AlR_3$ it is not necessary that R be the same in all positions in any aluminum compound. The aluminum compounds such as diisobutyl aluminum hydride, ethyl aluminum dihydride, and the like are operable as well as triisobutyl aluminum, triethyl aluminum, and the like.

The crux of this invention lies in the fact that the difunctional additives, e.g., sulfur, 2,4-pentane dione, dibutyl maleate and azobenzene, are capable of crosslinking the polyethylene aluminum alkyl blend in the absence of free molecular oxygen, i.e., in an inert atmosphere. It will be evident to one skilled in the art that the degree of crosslinking is very easy to control when the crosslinking agent is one which can be precisely weighed, and milled with the polymer blend to ensure homogeneity, rather than when crosslinking depends on atmospheric conditions and surface exposure.

These difunctional compounds share similar reactions with aluminated polymer, i.e. $(PCH_2CH_2)_2AlR$, in which P is the polymer residue, to form stable complexes or free radicals which further react to crosslink the polymer.

The sulfur appears to react in a way analogous to oxygen, that is:

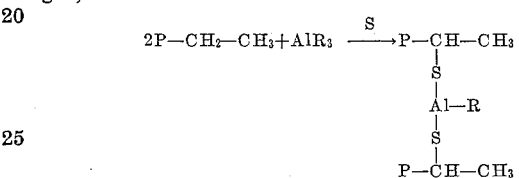

Similarly, the 2,4 pentane dione, dibutyl maleate, and azobenzene form stable complexes; the aluminum acts as a covalent type bridge between the additive and the polymer, possibly through an enolization mechanism.

The additives used in the process of this invention are not temperature dependent, i.e., they do not decompose, or react intermolecularly at any set temperature in any atmosphere. They do initiate crosslinking at whatever blending temperature is most suitable for the polymer aluminum alkyl blend.

It is critical in performing this invention that the polymer-$AlR_3$ mixture be blended in an oxygen-free atmosphere to insure that crosslinking will not occur during blending, and until the additives are mixed in. In some instances on blending where minute amounts of air or oxygen are present, a small degree of crosslinking is tolerable so long as the polymer remains thermoplastic and does not become thermoset and unworkable. It is also possible to expose the crosslinked polymer/$AlR_3$/additive blend to free molecular oxygen (or when removing from the bender or mold), to effect further small increases in crosslinking.

The blending step can be carried out in various ways. For example, the $AlR_3$ can be mixed in an oxygen-free atmosphere with polyethylene, preferably in powdered form, prior to heating the blend above the softening point of the polymer. A solvent, containing additive, can be used to more uniformly disperse the $AlR_3$ and additive throughout the polymer. Another method of blending is to imbibe the polymer in a solvent which will have a swelling effect on the polymer and, thereafter, add $AlR_3$ and additive to the swelled polymer. Still another method of blending is to add the $AlR_3$ and additive with or without a solvent therefor to the molten polyethylene. Solvents for the $AlR_3$ or the additives can be employed if desired and are used primarily as a safety precaution and as an aid to uniformity of dispersion.

The blending step is suitably performed in an inert oxygen-free atmosphere by mechanically mixing the $AlR_3$ and additive into the polyethylene at temperatures at which the polymer is sufficiently soft to be worked. In the case of low density polyethylene this temperature is about 90° C.–125° C., while in the case of high density polyethylene it is about 125° C.–200° C. Higher temperatures are operable, but are usually unecessary. Suitable equipment for the blending step includes that which can be adapted to maintain an oxygen-free system such as Brabender Plastographs, Banbury mixers, two-roll mills, injecting molding machines, extruders and the like. The operable amount of AlR₃ is 0.00015 to 0.1 mole, and the preferred amount is 0.0015 to 0.01 mole of AlR₃ per 100 grams polyethylene.

The amount of the bifunctional additive employed is not critical and can vary between wide limits. A range of 0.00015 to 1.0 or more mole of additive per 100 grams polyethylene is operable, and about 0.0015 to 0.10 mole additive per 100 grams polyethylene preferable. The degree of crosslinking in this invention is dependent upon both the amount of AlR₃ and additive added to the system. Larger amounts of additive within the aforesaid operable range will yield a thermoset polymer whereas amounts at the lower end of the operable range will crosslink the polymer to a point whereas the polymer remains thermoplastic, but with a lower melt index than that of the starting polyethylene.

The system during blending can be maintained oxygen-free by using a vacuum or by a positive pressure of an inert gas such as nitrogen or the noble gases, e.g. argon. Crosslinking of the blend can be carried out at temperatures ranging from room temperatures up to 300° C. or higher. Since polyethylene is subject to thermal degradation at temperatures of about 300° C., it is preferred to crosslink the polymers at a lower temperature, e.g., 225–275° C.

The crosslinked polyethylene produced by this invention can be used in the same manner as the commercial crosslinked polyethylene now in use. Such uses include film, pipe, and the like.

The crosslinked polyethylene compositions may include other additives which do not interact directly with the compound such as those normally employed in plastic compositions. By such additives is meant the inclusion of plasticizing, lubricating, extending, filling, stabilizing, flame-retarding the coloring ingredients such as dyes and pigments and also anti-oxidants, antistatic materials and the like. The choice of such additives would be obvious to one skilled in the art.

The following examples are set down for solely illustrative purposes and are not to be considered limiting in scope.

Throughout the instant invention the melt indices (MI) were measured under the conditions specified in ASTMD 1238–52T. The densities of the polyethylene were determined in accord with the conditions specified in ASTMD 1505–57T.

For the blending step, there was used a Brabender Plastograph Model P1–V2 adapted to maintain an oxygen-free atmosphere, e.g. nitrogen or a vacuum and equipped with a recording unit for measuring changes in torque. The crosslinking step was also performed on the Brabender Plastograph. The degree of crosslinking obtained when the polyethylene composition containing the aluminum compound is mixed with additive is related to the increase in torque measured by the Plastograph recorder from the time the additive is added to the system until the reaction is discontinued. The greater the degree of crosslinking, the greater the viscosity of the polyethylene composition, which in turn requires a greater torque in order to drive the Plastograph at a constant r.p.m.

*Example 1*

35 g. of commercially available polyethylene having a melt index of 5.0 and a density of 0.96 were charged to the oxygen-free mixing chamber of a Brabender Plastograph which had been evacuated and flushed three times with nitrogen. The polymer was milled in the chamber at 175° C. until molten. $2.5 \times 10^{-3}$ moles of diisobutyl aluminum hydride were added to the mixing chamber under a stream of nitrogen and milling was continued to uniformly disperse the aluminum compound in the molten polymer and obtain a constant torque. During this time, torque increased 820 units in 16.5 minutes. 0.033 g. sulfur was then added under nitrogen yielding a further torque increment of 2700 units in 3 minutes. The torque leveled at this point. After 10 minutes, oxygen (dry air) was admitted to the system and the torque increased an additional 700 units in 5 minutes.

*Example 2*

The procedure for Example 1 was followed, except that 1.0 ml. of a solution of dibutyl maleate (0.685 g. dibutyl maleate/1.0 ml. heptane) was added instead of sulfur. The torque measurement rose 1140 units in three minutes and then slightly declined. Introduction of air produced an addition increment of 200 units. The melt temperature throughout was 175°–180° C.

*Example 3*

The procedure of Example 1 was followed, except that 5.0 ml. of a heptane solution of 2,4-pentane dione (7.5 g. 2,4-pentane dione/100 ml. heptane) were added under nitrogen to the melt. The torque measurement rose 1220 units in 5 minutes. Air produced an additional increment of 300 units. Melt temperature was 175° C.–180° C.

*Example 4*

Following the procedure of Example 1, 5.0 ml. of 9.1% solution of azobenzene ($2.5 \times 10^{-3}$ moles azobenzene/ml. heptane) were added under nitrogen to the melt. The torque measurement rose 1500 units in 6 minutes. No air was admitted to the melt. Melt temperature was 175° C.

We claim:

1. The process of cross-linking normally solid polyethylene by blending same in an inert oxygen-free atmosphere at a temperature above its softening point with 0.00015 to 0.1 mole per 100 grams of said polyethylene of an aluminum alkyl compound of the formula

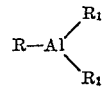

in which R is chosen from the group consisting of isobutyl and ethyl radicals and $R_1$ is a member of the group consisting of hydrogen, isobutyl, and ethyl radicals, in the presence of 0.00015 to 1.0 mole per 100 grams of said polyethylene of a difunctional additive chosen from the group consisting of sulfur, dibutylmaleate, 2,4-pentane dione and azobenzene.

2. The method according to claim 1 in which the additive is sulfur.

3. The method according to claim 1 in which the additive is dibutyl maleate.

4. The method according to claim 1 in which the additive is 2,4-pentane dione.

5. The method according to claim 1 in which the additive is azobenzene.

6. The method according to claim 1 in which air is introduced as a final step.

References Cited by the Examiner

UNITED STATES PATENTS

| | | | |
|---|---|---|---|
| 2,561,814 | 7/1951 | Novotny et al. | 260—94.9 |
| 2,838,437 | 6/1958 | Busse | 260—31.8 |
| 2,973,344 | 2/1961 | Fasce | 260—78.4 |
| 3,017,376 | 1/1962 | Bafford | 260—94.9 |
| 3,245,978 | 4/1966 | Gregorian et al. | 260—94.9 |

FOREIGN PATENTS 759,013   10/1956   Great Britain.

JOSEPH L. SCHOFER, *Primary Examiner.*